(12) United States Patent
Wilson

(10) Patent No.: US 6,682,811 B1
(45) Date of Patent: Jan. 27, 2004

(54) REINFORCED PROFILE EXTRUSION ARTICLES AND METHOD FOR MAKING THE SAME

(75) Inventor: Phillip S. Wilson, Commerce Township, MI (US)

(73) Assignee: Magna International of America, Inc., Troy, MI (US)

( * ) Notice: Subject to any disclaimer, the term of this patent is extended or adjusted under 35 U.S.C. 154(b) by 0 days.

(21) Appl. No.: 09/937,063

(22) PCT Filed: Apr. 4, 2000

(86) PCT No.: PCT/US00/06442

§ 371 (c)(1),
(2), (4) Date: Sep. 21, 2001

(87) PCT Pub. No.: WO00/62961

PCT Pub. Date: Oct. 26, 2000

Related U.S. Application Data

(60) Provisional application No. 60/129,539, filed on Apr. 16, 1999.

(51) Int. Cl.[7] .................................................. B32B 5/16
(52) U.S. Cl. ...................... 428/323; 428/324; 428/332; 428/402; 428/542.2; 156/242; 156/244.11; 156/250; 264/437; 264/464; 264/37.3; 264/109; 264/118; 264/119

(58) Field of Search ................................. 428/323, 328, 428/324, 332, 363, 402, 409, 537.1, 542.2, 543; 264/437, 446, 464, 479, 696, 37.3, 37.32, 642, 503, 109, 118, 119, 145; 156/242, 244.11, 244.24, 250

(56) References Cited

U.S. PATENT DOCUMENTS

| | | | |
|---|---|---|---|
| 5,552,469 A | * | 9/1996 | Beall et al. .................. 524/445 |
| 5,747,560 A | * | 5/1998 | Christiani et al. .......... 523/209 |
| 5,952,093 A | * | 9/1999 | Nichols et al. |

* cited by examiner

Primary Examiner—Merrick Dixon
(74) Attorney, Agent, or Firm—Pillsbury Winthrop LLP

(57) ABSTRACT

A reinforced continuous molded article which is equally reinforced in all aspects is suitable for molding into automobile exterior trim. The article comprises at least one thermoplastic, having essentially homogeneously mixed therein about 2% to about 15% by volume reinforcing particles having one or more layers of 0.7 nm–1.2 nm thick platelets, wherein more than about 50% of the reinforcing particles are less than about 20 layers thick. A method of producing reinforced articles comprising these reinforcing particles is also disclosed. Optionally, such articles may have embossed surfaces or may have a decorative film laminated thereto.

7 Claims, 2 Drawing Sheets

REINFORCED PROFILE EXTRUSION ARTICLES AND METHOD FOR MAKING THE SAME

This application is the National Phase of International Application PCT/US00/06442 filed Apr. 4, 2000 which designated the U.S. and that International Application which claims priority from provisional application Serial No. 60/129,539, filed Apr. 16, 1999 was published under PCT Article 21(2) in English.

GOVERNMENTAL SUPPORT AND INTEREST

The invention in this patent was made with Governmental support under Cooperative Agreement No. 70NANB7H3028 awarded to the Dow Chemical Company and Decoma International of America, Inc. (formerly Magna International of America, Inc.), project ID 1997-02-0047B, project name "NANOCOMPOSITES—NEW LOW COST/ HIGH STRENGTH MATERIALS FOR AUTOMOTIVE PARTS," awarded Sep. 30, 1997 by the United States Department of Commerce, National Institute of Standards and Technology, Advanced Technology Program. The Government has certain rights in this invention.

BACKGROUND OF THE INVENTION

Profile extrusion molding is a popular method for producing continuous uniform thermoplastic items having often complex cross sections for use as, for example, automobile exterior trim. The profile assumes the shape of the extrusion die of choice, and is cut and end-capped to form such articles as body side moldings. A single profile may be designed to fit many models of cars, making profile extrusion a popular after market process. A wide processing range of thermoplastic materials permits high outputs in profile extrusion. Continuous operation of an extruder permits uniform production of plastic products. The temperature required along the extruder barrel, adapter and die depend upon the specific extrusion process being conducted and the nature of the plastic used.

In a typical extrusion process, resin pellets are either gravity fed or force fed from a hopper into single or twin screw extruders and are conveyed along the screw surface. Solid and liquid additives, such as reinforcing additives and fillers, are often incorporated into the mix, and must be homogenously combined via distributive or dispersive mixing by the screw. Additives, however, can increase the viscosity of the polymer melt, thereby impairing the rate of extrusion. Additives that are difficult to disperse may be precompounded with molten polymer into pelletized concentrates. However, many such additives do not achieve even distribution throughout the melt, creating profile products having defects, such as uneven color or unreinforced points susceptible to stress.

Glass fibers are commonly used as reinforcing agents in conventional extrusion processes. Cut glass fibers may be added to the polymer melt, often at levels as high as 30% by weight. As the melt flows along the screw flight, these anisotropic glass fibers tend to align themselves parallel to the extrusion barrel in the direction of flow. Consequently, the resultant profile is unidirectionally strong in the longitudinal aspect. The plane transverse to the longitudinal direction is relatively weak, and thus relatively more prone to fracture upon impact. In addition, if the added glass fibers are not evenly dispersed during mixing of the melt, the degree of longitudinal strengthening of the profile will vary. Uneven, unidirectional reinforcement of this nature is highly undesirable in profile extrusion products used.

To overcome the disbursement problems associated with extrusion utilizing glass fiber, the process of pultrusion was developed. Pultrusion is characterized by pulling continuous glass strands through a tube containing a polymer matrix, thereby forming a reinforced continuous length rod having a constant cross section. A significant drawback to pultrusion is the unexpected presence of voids or channeling within the reinforced rods, due to entrapment of air bubbles during the pulling process. Extruded articles having such voids have low impact resistance and are susceptible to fracture.

Therefore, a need exists for improving the impact resistance of extrusion molded articles for use as, for example, automobile exterior trim.

SUMMARY OF THE INVENTION

An object of the invention is to provide a profile extrusion molded product having nearly uniform reinforcement in all aspects. The profile is formed from a material comprising at least one thermoplastic, and about 2% to about 15%, by volume, of reinforcing particles. The particles each comprise one or more layers, wherein at least 50% of the reinforcing particles are less than about 20 layers thick, at least 99% of the reinforcing particles are less than about 30 layers thick, and the layers comprise platelets having a thickness of between about 0.7 nm and 1.2 nm. Profiles comprising essentially homogeneously dispersed reinforcing particles in the given amounts have a uniformly reinforced cross section.

It is a further object of the invention to provide a method of manufacturing a highly reinforced extrusion molded part that is equally reinforced in all aspects as discussed above. In accordance with this object, the present invention provides a method of producing a reinforced article comprised of a continuous extrusion profile having good strength in all directions. The method prepares a melt of at least one thermoplastic, having about 2% to about 15%, by volume, of reinforcing particles. The particles each comprise one or more layers. At least 50% of the reinforcing particles are less than about 20 layers thick, at least 99% of the reinforcing particles are less than about 30 layers thick, and the layers comprise platelets having a thickness of between about 0.7 nm and 1.2 nm. The thermoplastic and reinforcing particles are intimately mixed via the rotational action of at least one screw housed in an extrusion barrel. The melt, including 2%–15% by volume reinforcing particles, is conveyed under pressure along the surface of at least one screw to a metering section from whence the melt is forced to exit through a shaping die at the discharging end of the extrusion barrel. The discharged portions of the melt are then cooled and cut to desired lengths.

These and other objects of the invention can be more fully appreciated from the following detailed description of the preferred embodiments.

BRIEF DESCRIPTION OF THE DRAWINGS

A preferred embodiment of the present invention is described herein with reference to the drawings wherein.

DETAILED DESCRIPTION OF THE PREFERRED EMBODIMENTS

Figure 1:
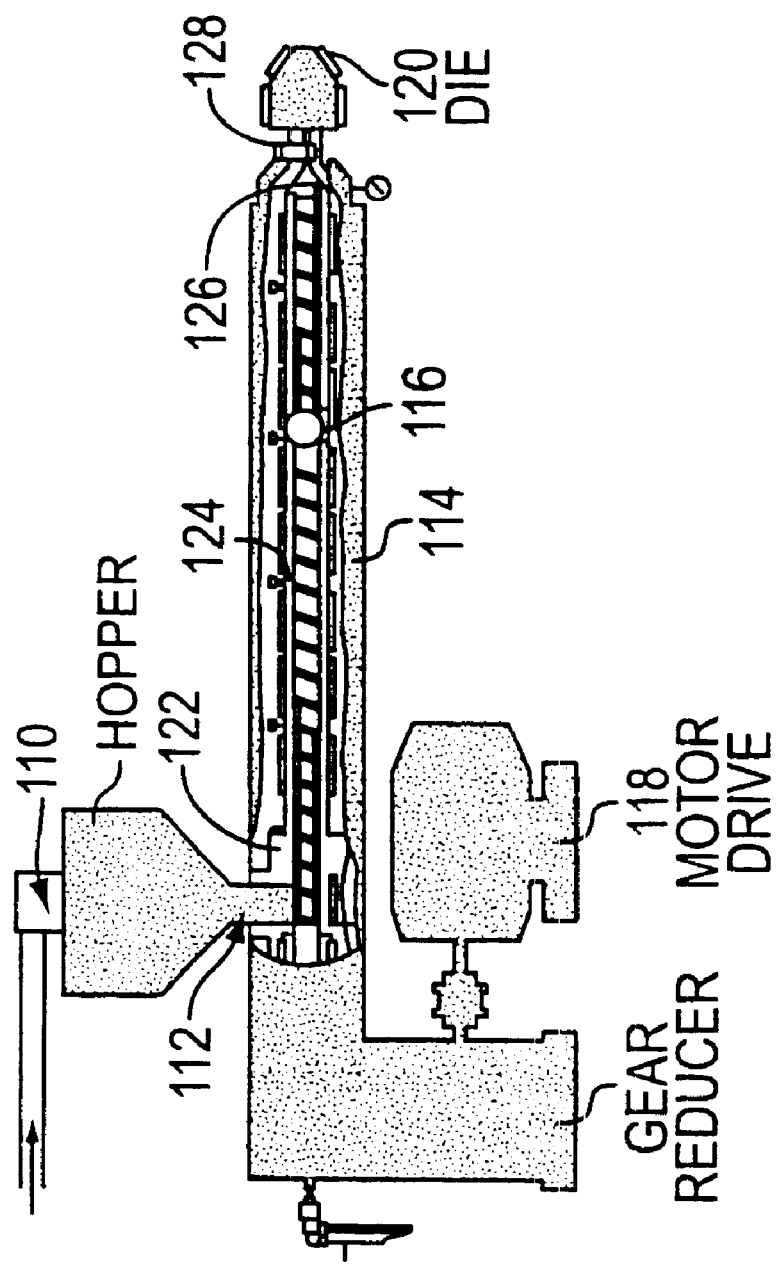
FIG. 1 is side view of a single screw extruder having a shaping die for profile formation.

During extrusion, resin pellets are fed from a supply depot to a hopper loader for collection in a receiving hopper 110, as depicted in FIG. 1. Pellets exit the hopper 110 through a feed throat 112 into the barrel 114 of an extruder. The resin pellets are plasticized in the melting section 122 of barrel 114 via the rotating action of at least one screw 116 extending the length of the barrel. Energy from the drive motor 118 is transferred via viscous energy dissipation through the screw 116 to the pellets, and heat is applied through the barrel walls, thereby melting the resin. The polymer melt thus formed is conveyed along the screw 116 to the compression section 124 of the barrel 114. Typically, the flight depth of the screw 116 decreases in the compression section 124 to facilitate mixing of the molten polymer into a homogeneous melt. The melt front flows from the compression section 124 to a metering section 126, which directs the melt through an exit port shaping die 120 located in the discharging end 128 of the extruder barrel 114.

Single screw extruders may be used, although counter rotating twin-screw extruders are better able to generate the high pressure needed in certain profile extrusion applications. In general, co-rotating twin screws can give excellent mixing while subjecting all melt material to essentially the same shear and temperature conditions. Preferably, the melt is subjected to dispersive mixing at a minimum of critical shear stress.

The articles (and the plastic melt from which the articles are molded) according to the present invention comprise a composite material of a polymer having dispersed therein reinforcement fillers in the form of very small mineral reinforcement particles. The reinforcement filler particles, also referred to as "nanoparticles" due to the magnitude of their dimensions, each comprise one or more essentially flat platelets. Generally, each platelet has a thickness of between about 0.7–1.2 nanometers. The average platelet thickness is approximately 1 nanometer.

The preferred aspect ratio of the reinforcement particles, which is the largest dimension of a particle divided by the thickness of the particle, is about 50 to about 300. At least 80% of the particles should be within this range. If too many particles have an aspect ratio above 300, the material can become too viscous for forming parts in an effective and efficient manner. If too many particles have an aspect ratio of smaller than 50, the particle reinforcements will not provide the desired reinforcement characteristics. More preferably, the aspect ratio for each particle is between 100–200. Most preferably at least 90% of the particles have an aspect ratio within the 100–200 range.

The platelet particles or nanoparticles are derivable from larger layered mineral particles. Any layered mineral capable of being intercalated may be employed in the present invention. Layered silicate minerals are preferred. The layered silicate minerals that may be employed include natural and artificial minerals. Non-limiting examples of more preferred minerals include montmorillonite, vermiculite, hectorite, saponite, hydrotalcites, kanemite, sodium octosilicate, magadiite, and kenyaite. Mixed Mg and Al hydroxides may also be used. Various other clays can be used, such as claytone H.Y. Among the most preferred minerals is montmorillonite.

To exfoliate the larger mineral particles into their constituent layers, different methods may be employed. For example, swellable layered minerals, such as montmorillonite and saponite are known to intercalate water to expand the inter layer distance of the layered mineral, thereby facilitating exfoliation and dispersion of the layers uniformly in water. Dispersion of layers in water is aided by mixing with high shear. The mineral particles may also be exfoliated by a shearing process in which the mineral particles are impregnated with water, then frozen, and then dried. The freeze dried particles are then mixed into molten polymeric material and subjected to a high sheer mixing operation so as to peel individual platelets from multi-platelet particles and thereby reduce the particle sizes to the desired range.

The polymer composites of the present invention are prepared by combining the platelet mineral with the desired polymer in the desired ratios. The components can be blended by general techniques known to those skilled in the art. For example, the components can be blended and then melted in mixers or extruders. The ratios will be determined based on, for example, desired dimensional stabilization and/or desired mechanical properties of the final molded article.

An additional advantage that accrues in accordance with the present invention is that reinforced articles of thinner profiled cross sections can be extruded. Particularly, articles that are reinforced with glass fibers have cross sectional dimensions that are limited by the relatively large dimensions of the glass strands. Typical glass fibers have a diameter of about 6–20 microns. In contrast, the articles molded in accordance with the present invention can be made with cross sections that are as thin as enabled by the particular thermoplastic being used, having the desired loadings of nanometer-sized reinforcement particles as discussed herein. Thus, reduced areas of cross-sectional thickness can be achieved in the extrusion process of the present invention compared with profiles reinforced by conventional means. If desired, standard glass reinforced resins may be further reinforced by the inclusion of nanometer-sized reinforcement particles according to the invention. Such combinations of reinforcing materials permits conventionally produced articles to have some improvement in transverse strength and toughness.

The typical product formed by profile extrusion is an elongated product, such as vehicle side moldings, and generally has a constant cross section throughout its longitudinal extent. Some shaping of the hot melt exiting the extrusion die may be performed and is well known in the art. The most common form is the embossing of the surface to a grained appearance, such as various leather or wood-type grains.

The appearance of the extruded profile may be altered by adhering materials to the profile before the shaped melt significantly cools. Accordingly, the invention contemplates a decorative film laminated to at least one surface of an extruded reinforced profile. Examples of such decorative films include metallic foils and laminate wood textures. Lamination may be achieved by standard processes known in the art.

Additional specific preferred methods, for the purposes of the present invention, for forming a polymer composite having dispersed therein exfoliated layered particles are disclosed in U.S. Pat. Nos. 5,717,000, 5,747,560, 5,698,624, and WO 93/11190, each of which is hereby incorporated by reference. For additional background, the following are also incorporated by reference: U.S. Pat. Nos. 4,739,007 and 5,652,284.

Generally, extrusion processes are preferred for certain high volume applications of reinforced plastics. Automotive exterior trim parts produced by profile extrusion molding can be long, continuous pieces having a uniform cross section. Uniformly reinforced molded-profiles for automotive trim may be produced by extrusion according to the invention. Reinforced body side molding, rails on luggage racks and even luggage racks themselves may be made as well. Reinforced tie down rails on pick up truck boxes are also contemplated according to the invention. Such reinforced molded articles exhibit excellent strength, modulus range, impact resistance and dimensional stability and are suitable for use on an automobile exterior.

Figure 2:
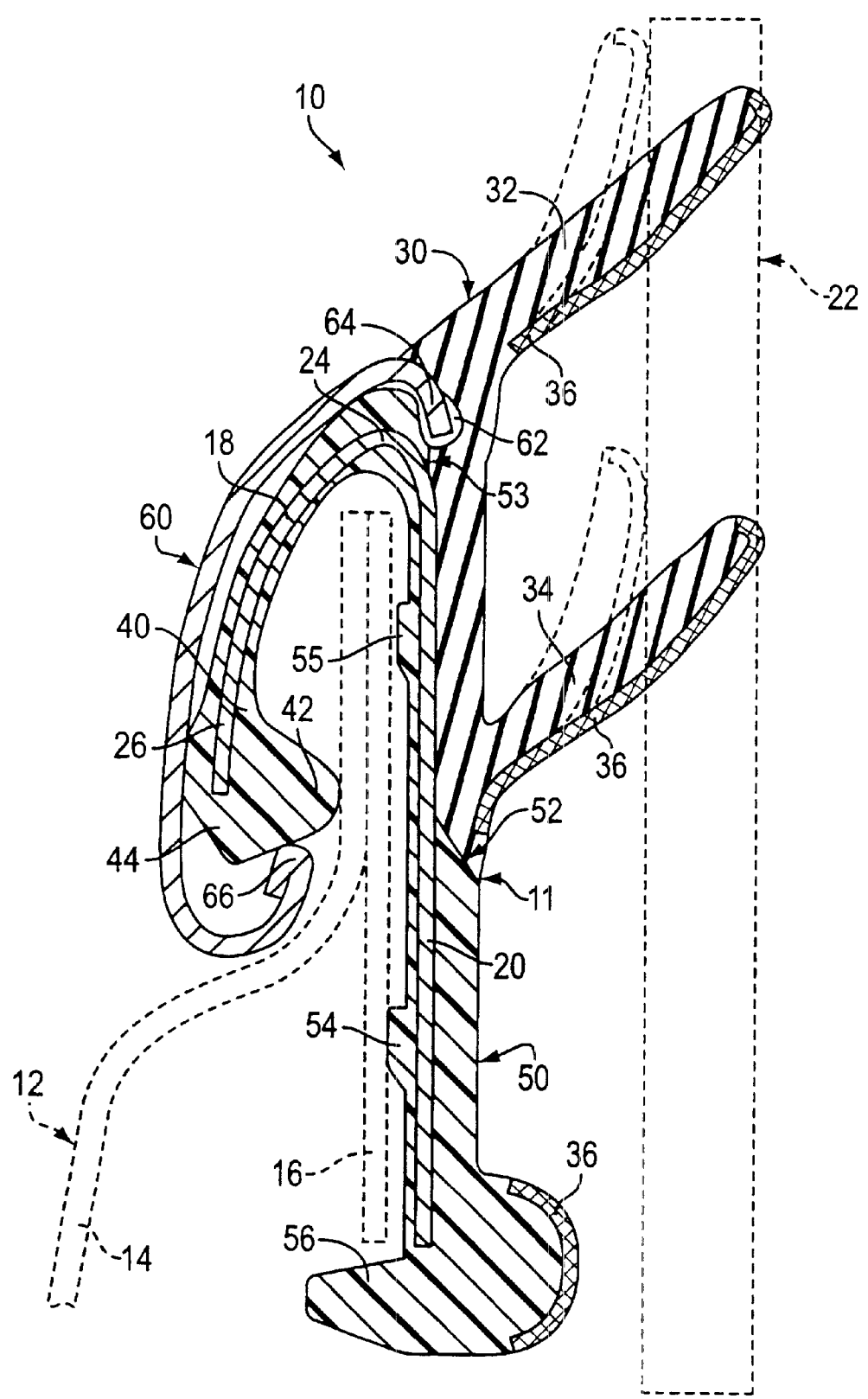
FIG. 2 is a cross-sectional view taken through a belt-line window molding shown installed on a vehicle door in accordance with the principles of the present invention.

Extruded reinforced article produced according to the invention also include a variety of sealing systems for doors and windows, as depicted in FIG. 2. Inclusion of reinforcing nanoparticles in the resin melt will substantially enhance stiffness of thin sealing system components. Such reinforced sealing members may exhibit good stiffness without compromising the flexibility and toughness needed for withstanding repeated raising and lowering of windows or opening and closing of doors. The added strength afforded by reinforcing nanoparticles will permit thinner, better conforming shapes to be extruded, which will enable noise reduction due to better sealing properties.

Typical resins used in profile extrusion molding include nylon, polypropylene, thermoplastic polyester and polycarbonate. The process permits use of recycled materially such as scrap polyolefins. Preferably, the thermoplastic used in the present invention is a polyolefin or a homogenous or copolymer blend of polyolefins. The preferred polyolefin is at least one member selected from the group consisting of polypropylene, ethylene-propylene copolymers, thermoplastic olefins (TPOs), and thermoplastic polyolefin elastomers (TPEs). For high performance applications, engineering thermoplastics are most preferred. Such engineering thermoplastic resins may include polycarbonate (PC), acrylonitrile butadiene styrene (ABS), a PC/ABS blend, polyethylene terephthalates (PET), polybutylene terephthalates (PBT), polyphenylene oxide (PPO), thermoplastic polyurethanes (TPU) or the like.

The exfoliation of layered mineral particles into constituent layers need not be complete in order to achieve the objects of the present invention. The present invention contemplates that more than 50% of the particles should be less than about 20 nanometers in thickness. Otherwise stated, more than about 50% of the particles should be less than about 20 platelets stacked upon one another in the thickness direction. In addition, at least 99% of the particles should have a thickness of less than about 30 layers. Preferably, at least 90% of the particles should have a thickness of less than about 5 layers. It is most preferable to have as many particles as possible to be as small as possible, ideally including only a single platelet. Particles having more than 30 layers may behave as stress concentrators and are preferably avoided, to the extent possible.

Generally, in accordance with the present invention, each of the automotive parts that can be manufactured in accordance with the principles of the present invention should contain nanoparticle reinforcement in amounts less than 15% by volume of the total volume of the part. The balance of the part is to comprise an appropriate thermoplastic material and optionally, suitable additives. If greater than 15% by volume of reinforcement filler is used, the viscosity of the composition can become higher than what is desirable for molding. Preferably, the amount of reinforcing nanoparticles is greater than 2% by volume, as lower amounts would not achieve the desired increase in strength.

Preferably, relatively rigid profile extrusion molded exterior trim parts comprise reinforcement particles of the type described herein at about 2–15% of the total volume of the part, with the balance comprising the thermoplastic substrate. It is even more preferable for these exterior trim pieces to have reinforcement particles of the type contemplated herein comprising about 3%–8% of the total volume of the part. For some applications, inclusion of about 3%–5% by volume reinforcing nanoparticles is optimal.

When about 90% of the reinforcing nanoparticles in the composition are less than 5 nm in thickness, a more preferred uniform distribution of the particles throughout the resin is achieved, which translates into homogeneous reinforcement throughout the molded profile. The extremely small size of these reinforcing particles permits intimate mixing without damaging the particles. A reduction to near elimination of unreinforced areas in cross section occurs in the final extruded profile, accordingly.

Reinforced profiles produced according to the invention have good impact resistance and exhibit 2–4 times the modulus of traditionally reinforced articles without losing strength. Unlike profiles reinforced with glass fibers, the inventive profiles are strong and stable in the XYZ dimensions, and are not limited to unidirectional reinforcement. This is primarily due to the greater uniformity of distribution and smaller aspect ratios of the nanoparticle reinforcements of the present invention in comparison with conventional glass fibers. Therefore, profiles extruded according to the invention have good impact resistance in a plane transverse to the longitudinal direction. Specifically, impact resistance in the transverse plane is generally at least 80% of the impact resistance in the longitudinal direction 90 degrees to the transverse plane.

In addition to reinforcing agents, other additives may optionally be included in the polymer composition to improve process ability. For example, aging modifiers, such as glycerol monostearate, are useful additives in polymer compositions for molding. Aging modifiers are typically present in an amount from about 0.5% to about 5% thermoplastic resin. Other additives include pigments, heat stabilizers, antioxidants, flame retardants, ultraviolet absorbing agents and the like.

Reinforced articles of the invention exhibit improved properties over nonreinforced articles. For example, polyethylene articles having about 5% nanoparticles by volume, wherein 90% of the particles have 5 or fewer layers, increased flexural modulus by 2.5 to about 3 times over compositions lacking reinforcing nanoparticles, as measured under ASTM D790 test conditions. This 5% nanoparticle polyethylene article exhibited >200% elongation to rupture. By contrast, about 25–30% glass fiber reinforcement is required in such articles to achieve an equivalent modulus. Reinforced polymer articles according to the invention should show from at least 50% to 60% improvement in flexural modulus over articles lacking reinforcement nanoparticles. Thus, the use of reinforcing nanoparticles according to the invention provides articles having good flexural stiffness.

A particularly advantageous application of the present invention relates to the area of window moldings.

FIG. 2 is a cross-sectional view taken through a belt-line window molding 10 shown installed on a vehicle door in accordance with the principles of the present invention. As shown, the main body 11 includes a seal member or seal structure 30, and a door mounting structure 50. The door mounting structure has rigid interior support structure 18, preferably made of aluminum, Steel, hardened plastic, or other rigid material can also be used. The support structure 18 includes a substantially flat plate portion 20, which is constructed and arranged to extend downwardly between the door body 12 and the vehicle window, which window is represented generally in broken-line configuration by reference numeral 22. The support structure 18 further includes an upper bent portion 24 extending from the plate portion 20 and is constructed and arranged to bend over the joint between the inner door panel 16 and outer door panel 14. The support structure 18 then extends downwardly from the bent portion 24 to flange portion 26 thereof. In essence, the support structure 18 has an inverted-J cross-sectional configuration.

Support structure 18 is imbedded along its entire extent within the seal or member 30 and the door mounting structure 50, as shown. The seal member 30 and door mounting structure 50 together form the main body 11 of the window molding 10. The upper part of plate portion 20 on the window facing side thereof, is covered by the seal member 30. The seal member 30 is preferably made from a flexible, resilient material comprising at least one thermoplastic such as a polymer resin, having reinforcing nanoparticles disbursed throughout. The reinforcement particles comprise about 2% to about 15% of a total volume of the resin part. At least 50% of the reinforcement particles have a thickness of less than about 20 layers, and at least 99% of the reinforcing particles have a thickness of less than about 30 layers.

As discussed above, substantially all of the platelet layers have a thickness of between about 0.7 nm and 1.2 nm. The reinforcing particles are essentially homogeneously dispersed throughout the thermoplastic such that the seal member 30 has a uniformly reinforced cross section. As a result, impact resistance and/or tear resistance in the transverse plane is generally at least 80% of the impact resistance in the longitudinal direction 90 degrees to the transverse plane.

Seal member 30 preferably includes an upper seal portion 32 and a lower seal portion 34, which portions extend generally between the door body 12 and the window 22 to prevent external elements, such as rainwater, from entering between the door body 12 and window 22. The underside of the upper seal portion 32 and the underside of the lower seal portion 34 are provided with conventional dorrie flock material, indicated by reference numeral 36. The upper seal portion 32 and the lower seal portion 34 are constructed and arranged to flex and apply a resilient force against the window 22, as can be appreciated from the broken-line illustration of the upper seal portion 34. In particular, the upper seal portion 32 and the lower seal portion 34 force the dorrie flock material against the window, with the dorrie flock material providing a sliding friction seal, which permits sliding movement of the window, but prevents rainwater from seeping between the window 22 and door body 12.

Preferably, the reinforced seal member 30, the mounting structure 50, the dorrie flocks 36, and the support structure 18 are extruded together in an in-line extrusion process. After these elements have been manufactured, a cover trim member 60 is snapped in place to cover the flange portion 40 of the mounting structure 50 for aesthetic and protective purposes, as disclosed in International Application WO 98/01313, the entire contents of which are hereby incorporated herein by reference.

Because the seal member 30 is provided with the reinforcing particles as discussed above, stiffness of the seal member 30 is enhanced, while the needed toughness for repeated flexing as windows are opened and closed is maintained. Modulus of reinforced resin according to the invention is increased about 1.5–4 times greater than that of non-reinforced resin. Repeated elongation by flexing is increased by more than 20%. Such characteristics will provide a reduction in wind noise due to better sealing and the possibility thinner, better conforming shapes than can be achieved using conventional sealing members known in the art.

It should be appreciated that the foregoing description is illustrative in nature and that the present invention includes modifications, changes, and equivalents thereof, without departure from the scope of the invention.

What is claimed is:

1. A reinforced continuous molded article comprising:
   at least one thermoplastic, and
   about 2% to about 15%, by volume, reinforcing particles,
   said particles each comprising one or more layers, at least 50% of said reinforcing particles being less than about 20 layers thick, at least 99% of said reinforcing particles being less than about 30 layers thick, and said layers having a thickness of between about 0.7 nm and 1.2 nm,
   wherein said reinforcing particles are essentially homogenously dispersed throughout the thermoplastic such that the molded article has a uniformly reinforced cross section.

2. A reinforced continuous molded article according to claim 1, wherein the uniformly reinforced cross section exhibits an impact resistance in a transverse plane of at least 80% of impact resistance in a longitudinal direction 90 degrees to the transverse plane.

3. A method of producing a reinforced continuous molded article comprising:
   preparing a melt of at least one thermoplastic and about 2% to about 15%, by volume, of reinforcing particles,
   said particles each comprising one or more layers, at least 50% of said reinforcing particles being less than about 20 layers thick, at least 99% of said reinforcing particles being less than about 30 layers thick, and said layers having a thickness of between about 0.7 nm and 1.2 nm;
   intimately mixing said thermoplastic and said reinforcing particles via the rotational action of at least one screw housed in an extrusion barrel,
   conveying said melt, including said 2%–15% by volume reinforcing particles, along the surface of at least one screw to a metering section,
   forcing said melt to exit from the metering section through a shaping die at a discharging end of the extrusion barrel, and
   cooling said melt, wherein cooled discharged portions of said melt are then cut to desired lengths, forming an extruded profile being equally reinforced in all aspects.

4. A method of producing a reinforced continuous molded article according to claim 3, wherein the lengths equally reinforced in all aspects exhibit an impact resistance in a transverse plane of at least 80% of impact resistance in a longitudinal direction 90 degrees to the transverse plane.

5. A method according to claim 3, wherein the extruded profile has an embossed surface.

6. A method according to claim 5, wherein said embossed surface comprises a member selected from the group consisting of a leather grained surface and a wood grained surface.

7. A method according to claim 3, wherein a decorative film is laminated to at least one surface of the extruded profile.

* * * * *